Jan. 22, 1963   G. T. TRIFONOFF   3,074,320
SECURING AND RELEASING SYSTEM
Filed Dec. 5, 1960
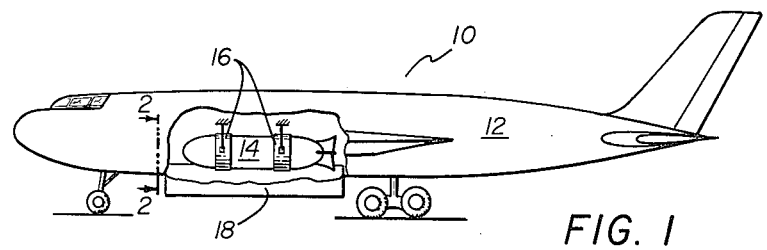
FIG. 1
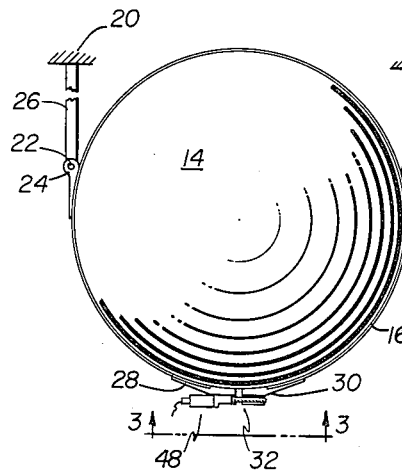
FIG. 2
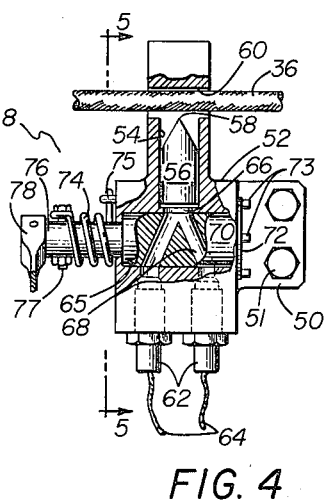
FIG. 5
FIG. 4
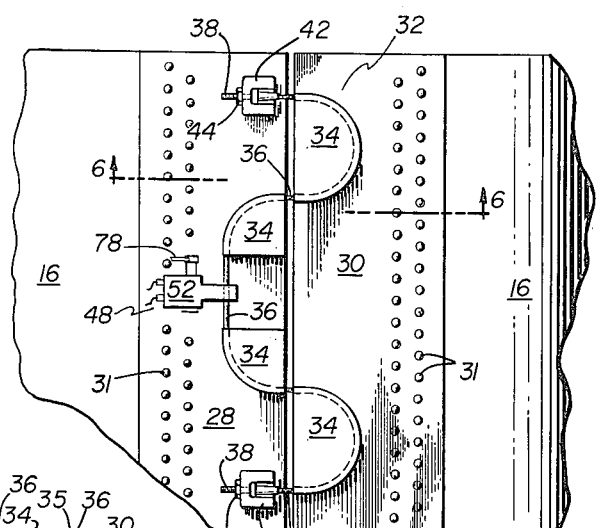
FIG. 3
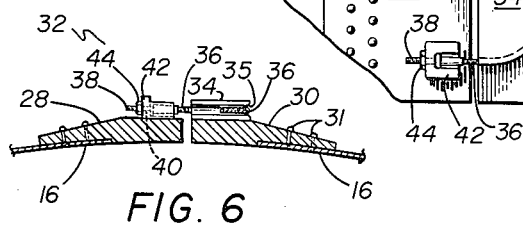
FIG. 6
INVENTOR.
GEORGE T. TRIFONOFF
BY Duane C. Bowen
ATTORNEY United States Patent Office 3,074,320
Patented Jan. 22, 1963

3,074,320
SECURING AND RELEASING SYSTEM
George T. Trifonoff, Wichita, Kans., assignor to Boeing Airplane Company, Wichita, Kans., a corporation of Delaware
Filed Dec. 5, 1960, Ser. No. 73,537
2 Claims. (Cl. 89—1.5)

My invention relates to a system securing elements together by a laced cable and releasing the elements by operation of an explosive-powered cable cutter severing the cable. The invention was conceived as a part of a system for suspending bombs or the like in aircraft bomb bays in which a band encircles and supports the bomb. The band is divided beneath the bomb and is secured together by the laced cable. Dropping of the bomb is accomplished by cutting the cable with the cable cutter.

The disclosure of the invention will have the following order: (a) a discussion of the environment, the requirements, the difficulties with prior systems, and the objectives of the invention, (b) a general system description, (c) a detailed disclosure of the cable cutter, and (d) a review of system operation.

*Environment, Requirements, Prior Systems and Objectives*

Bombs, fuel tanks and other jettisonable bodies frequently are suspended inside of an aircraft or attached to its exterior in a manner permitting dropping of these bodies. Such body must be quickly released and extremely high reliability of the release mechanism is required. The aircraft mission may fail or aircraft safety may be endangered if timely release is not accomplished. The weight of the body may be high yet the release mechanism should be compact, simple and of low weight. The objects of my invention include providing a securing and release system for such bodies that has the needed reliability, compactness, simplicity and low weight.

Full surface contact of the band with the body is desirable to keep compression forces of the tensed band evenly distributed over as large an area as possible whereby a minimum thickness body shell may be used. The shell may be damaged if the band is overtensed. The objects of my invention include providing a securing and release system that is adaptable to a wide band, that distributes securing force evenly, that is readily controllable in applied tension, and that is suitable for use with thin-shelled bodies.

Prior bomb securing and releasing mechanisms included (1) systems using one or more clamping jaws gripping the body to be jettisoned and releasing the body by means of an electrically or mechanically operated mechanism, (2) systems having integral lugs, rings or the like on the body to drop therewith that were engaged by other parts of the securing and releasing mechanism remaining with the aircraft, and (3) mechanisms using a divided band held together by some mechanical system.

There were various disadvantages in the above-described systems. (1) Some devices had a multiplicity of moving parts that failed to operate on occasion because of freezing, fouling, incorrect installation, etc. Electrical or mechanical failures also caused trouble. (2) Mechanical protuberances integral with the body were disadvantageous both in loading on the ground and in dropping. The shape, size and location of the lugs and rings on the body had to be exactly compatible with other parts of the securing and releasing system on the aircraft. The protuberances had a detrimental effect on accuracy when the bodies were dropped. Because of concentrated stresses at the attachment points, a relatively thick, heavy container shell had to be used for the body. (3) Some systems upon release allowed free fall of suspension bands or other structure that could damage the aircraft or jam some mechanical system. Fuel tanks or the like could be parachuted but other free-falling release apparatus could injure persons on the ground. It is a further object of my invention to minimize moving parts of the system and to avoid the possibility of frozen, fouled or jammed mechanism; to provide no parts which must remain secured to the body after it is dropped, thereby avoiding aerodynamic difficulties; to avoid critical problems of alignment and tolerances in installing the system and in its operation; to provide a system which permits use on thin-shelled bodies; and to avoid use of parts which fall separately when the body is dropped.

Further objects of my invention include: to provide a suspension band for a body, and releasable securing means therefor, that are simple in construction, uniformly positive in operation, free from likelihood of electrical or mechanical malfunction, economically manufacturable, and easily maintainable; to provide a suspension band for aircraft-borne loads having a laced cable fastening and an explosive-powered cutter operative to sever the cable to release the article from suspension; and to provide safety means within the cable cutter to prevent premature release of the suspended article.

My invention will be best understood, together with additional advantages and objectives thereof, from the following description and from the drawings, in which:

FIGURE 1 is an elevation view of an aircraft with a portion of the fuselage broken away showing a bomb suspended therein by a specific embodiment of my suspension and release system;

FIGURE 2 is an enlarged end elevation view taken on line 2—2 of FIGURE 1;

FIGURE 3 is a greatly enlarged fragmentary bottom view taken on line 3—3 of FIGURE 2;

FIGURE 4 is an enlarged plan view, partly in section, of the explosive-powered cable cutter with its safety valve in operating position;

FIGURE 5 is an end view, partly in section, taken primarily on line 5—5 of FIGURE 4, which shows the valve in safety position; and FIGURE 6 is a view, partly in section, taken on line 6—6 of FIGURE 3.

*General System Description*

An aircraft 10 is shown in FIGURE 1 with a portion of the fuselage 12 broken away in the bomb bay area revealing a bomb 14 supported by suspension bands 16. Fuselage 12 has bomb bay doors 18 that are opened during loading and dropping of bomb 14.

Suspension bands 16 are affixed to supporting structure 20 within airplane fuselage 12, as shown in FIGURE 2. Band 16 is secured to structure 20 by simple hinges including pins or bolts 22 disposed in loops or eyes 24 attached to the sides of band 16, and extending through openings in dependent structural members 26. Although the embodiment of my invention shows a bomb supported within a fuselage, the support and release system can be used in other applications, such as support of a bomb, missile or fuel tank beneath a wing. The cable securing and release system, hereafter to be described, may have other uses including non-aircraft applications.

Band 16 is divided beneath bomb 14 to permit its release. The band may be straight or curved when unrestrained. If curved, the band is sufficiently resilient to spread under the weight of the bomb when released. Attached to the ends of band 16 are two end members 28, 30 which are shown as secured by rivets 31 but which may be secured by welding, by bolting, or by other systems. End members 28, 30 may be plates, castings or forgings. The inner surfaces of members 28, 30 are arcuate to match the cylindrical surface of bomb 14, thereby providing full surface contact of band 16 with article 14.

End members 28, 30 of band 16 are secured together by my new and improved securing and releasing means 32, as shown in FIGURE 3. The inventive concept includes lacing the band ends together and using an explosive-powered cable cutter to sever the cable to release bomb 14. This concept is highly advantageous in solving the problems with prior bomb suspension and release systems which were reviewed above.

Grooved cable pull blocks 34 are formed on or attached to the outer surfaces of members 28, 30. Pull blocks 34 may be described as sectors of sheaves having grooves, as 35. Cable 36 is laced in tension around pull blocks 34. Attached to the ends of cable 36 are threaded shanks 38 which pass through openings 40 in lugs 42. Lugs 42 are integral with or secured to end member 28. Tension nuts 44 are threaded onto the ends of shanks 38.

The use of a laced cable, which may have two ends or be endless, combined with the concept of using a cable cutter 48 for release, solves many of the above-mentioned problems with bomb release and the like. One characteristic is positive release action. Once the cable is cut, no mechanical problem remains in achieving a successful release. The cable cutter inherently has high reliability, as it is a basically simple system. However, specifications should be developed so the cable cutting system, particularly the ballistic charges, is adapted to environmental conditions such as temperature, vibration, electromagnetic radiation, etc. The body which is released does not have part of the securing and release system remaining attached thereto, whereby aerodynamic shape is not compromised. During loading of the article to be dropped, the problem of mating is minimized, e.g., the laced cable system permits broad tolerances. The system inherently avoids problems of misassembly so that failures in securing and releasing should not occur.

The tension nuts 44 can be tightened with a torque wrench so that tension about bomb 14 or other bodies can be closely controlled, permitting support of thin-shelled bodies without damage due to excessive band tension. Cable 36 can slide in grooves 35 in pull blocks 34, or in other functionally similar cable engaging members, so that tension is substantially uniform in various areas of band 16 along the lacing. Problems are avoided of overstressing one band area while other areas are within tolerances, as the cable lacing method permits little differential in tension from one area of the band to another.

An explosive-type cable cutter 48, operative to sever cable 36, is shown as substantially centered on cable 36, although other locations would be functionally equivalent. Cable cutter 48 is secured to end member 28 preferably by bolts. The cable cutter is similar in operation to commercially available explosive-type cable cutters but carries two ballistic charges instead of one and provides safety valve means to prevent severing of cable 36 upon accidental ignition of the ballistic charges. Cable cutter 48 will be described below in such detail as will show modifications from such prior cable cutters. One unique concept of the present invention is the use of a cable cutter in a laced cable securing system for bands or other applications. This innovation adds greatly to the simplicity and reliability of my securing and releasing system.

Cable Cutter

Cable cutter means 48 includes cutting means, actuating means, and a safety valve system. A cutter housing 52 is supported on member 28 by a mounting flange 50 secured by bolts 51. Housing 52 has an inner bore 54 slidably receiving a piston 56. One end of piston 56 is formed as a straight knife-edge cutting blade 58 the length of which is substantially equal to the diameter of bore 54. Cable 36 passes through an opening 60 in housing 52. Knife blade 58 is arranged transversely of opening 60 in housing 52 so that it will intersect cable 36.

The force to drive piston 56 is obtained by ignition of either or both of two explosive or ballistic cartridges 62 threadedly secured in housing 52. These are standard items and are commercially available. Ballistic cartridges 62 may be fired in the normal way by electrical wires 64 leading to them from a remote external source of electrical power and through a control switch, neither of which is shown. Two cartridges are preferred to insure release operation in case one cartridge is defective. However, the cartridges have high reliability.

A safety valve 65 is incorporated in cable cutter means 48 to prevent premature severing of cable 36 and release of bomb 14 by accidental firing of either ballistic cartridge 62. In the safety or "off" position of valve 65, shown in FIGURE 5, the passageway 66 to piston 56 is blocked by the valve cylinder 70, and passageway 67 in cylinder 70 exhausts gases from any premature cartridge ignition to the atmosphere through port 71. As before stated, cartridges should be specified capable of withstanding any environment factors, such as elevated temperature or radiation, that would cause premature firing, but the safety valve is a fail-safe precaution. FIGURE 4 shows valve 65 in operating or "on" position in which gases from cartridges can pass through valve cylinder passageway 68 and passageway 66 to act on piston 56, thereby to sever cable 36.

Valve cylinder 70 is secured in place by retainer cap 72 and screws 73. A torque spring 74, attached to housing 52 at 75 and attached to valve shaft 76 by bolt 77, normally holds the valve in the safety position. A cable (not shown) leading from a remote position, i.e., the airplane cabin, connects to a lever 78 secured to the end of valve shaft 76. Movement of the cable rotates the safety valve from safety position to operating position, overcoming the resistance of torque spring 76, to ready the cable cutting means for bomb dropping.

Operation

Bomb 14 may be quickly and easily suspended within an aircraft with the present system. The mechanism, including members 26, may be designed as a part of a bomb clip-in system so that band 16 is secured to bomb 14 before loading if this is desired. If assembled in the bomb bay, bands 16 may have a normally open disposition so it will be necessary only to raise bomb 14 into position and to lace and tense cable 36. As before indicated, tension can be controlled by using a torque wrench on cable tension nuts 44. Safety valve 65 is preferably maintained in the safety position until time for bomb release.

When the time for bomb dropping arrives, safety valve 65 is moved to operating position. Electrical power is then applied to cartridges 62 through wires 64, and pistons 56 are powered to cut cables 36. The lacing of cable 36 is broken and bands 16 spring open or are force open by the weight of bomb 14, and the bomb drops.

From the foregoing description, the structure and the operation in aircraft bomb dropping applications will be understood and the way the objectives of the invention are met will be evident. Adaptation of the invention to other aircraft and non-aircraft uses will be evident to those skilled in the art.

Having thus specifically described my invention, I do not wish to be understood as limiting myself to the precise details of construction shown, but instead wish to cover those modifications thereof which will occur to those skilled in the art from my disclosure and which fall within the scope of my invention, as described in the following claims.

I claim:

1. The improvement in securing and releasing a band encircling a body of a bomb, missile or the like and used to suspend the same from supporting structure in an aircraft bomb bay, comprising: said band being divided below said body forming two band ends and securing and releasing means releasably securing together the band ends, the band ends being separable permitting the body to fall free upon release by said securing and releasing means, said securing and releasing means including a securing cable, said band ends each having end members having cable pull block means each grooved oppositely to the other band end to receive said securing cable which is laced in a serpentine manner about said pull blocks in the grooves from one band end to another in a manner securing said band ends together; said cable having two ends and means securing said cable ends to one of said band ends, said last-mentioned means being operable to adjustably tense said cable about said pull block means thereby adjustably tensing said band about said body; an explosive-powered cable cutting means intermediate the ends of said cable operable to sever the cable to release said band ends whereby said body will drop; and means operable to fire the explosive of said cable cutting means to operate the same.

2. The subject matter of claim 1 in which said cable cutting means has a safety valve having an operating position in which explosive power is applied to operate the cable cutting means and having a safety position in which explosive power, upon accidental firing, is routed to the atmosphere and does not operate the cable cutting means, the valve being spring pressed towards the safety position so that the valve must be held in operating position.

References Cited in the file of this patent
UNITED STATES PATENTS

| | | |
|---|---|---|
| 535,248 | Jenks | Mar. 5, 1895 |
| 1,627,019 | Dornier | May 3, 1927 |
| 1,915,435 | Miller | June 27, 1933 |
| 2,346,494 | Leland | Apr. 11, 1944 |
| 2,581,645 | Frieder et al. | Jan. 8, 1952 |
| 2,665,088 | Lobelle | Jan. 5, 1954 |
| 2,786,392 | Niedling | Mar. 26, 1957 |